(12) United States Patent
Irwin et al.

(10) Patent No.: US 7,552,906 B2
(45) Date of Patent: Jun. 30, 2009

(54) VALVE ASSEMBLY

(75) Inventors: Kevin M. Irwin, Tucson, AZ (US); Kenneth J. Skripkar, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 125 days.

(21) Appl. No.: 11/487,734

(22) Filed: Jul. 17, 2006

(65) Prior Publication Data

US 2008/0035220 A1 Feb. 14, 2008

(51) Int. Cl.
*F16K 31/00* (2006.01)

(52) U.S. Cl. ..................... 251/61.2; 251/331

(58) Field of Classification Search ............... 251/61.1, 251/61.2, 30.01, 30.02, 331
See application file for complete search history.

(56) References Cited

U.S. PATENT DOCUMENTS

| | | | |
|---|---|---|---|
| 2,015,055 A | | 9/1935 | Adams, Jr. |
| 3,337,178 A | * | 8/1967 | Gordon ....................... 251/56 |
| 3,367,621 A | | 2/1968 | Griswold |
| 3,379,406 A | | 4/1968 | Greer |
| 3,792,720 A | * | 2/1974 | Robbins ................ 137/625.28 |
| 3,934,812 A | | 1/1976 | Pett |
| 4,135,696 A | * | 1/1979 | Saarem et al. ........... 251/30.02 |
| 4,181,151 A | * | 1/1980 | Ensign ................... 137/625.28 |
| 4,274,452 A | * | 6/1981 | Schmitt .......................... 141/1 |
| 4,276,905 A | | 7/1981 | Lourdeaux |
| 4,304,260 A | | 12/1981 | Turner et al. |
| 4,624,442 A | * | 11/1986 | Duffy et al. ................. 251/61.1 |
| 4,659,062 A | * | 4/1987 | Mooney ..................... 251/61.1 |
| 4,977,923 A | | 12/1990 | Cho |
| 5,247,964 A | | 9/1993 | DeLange |
| 5,464,040 A | | 11/1995 | Johnson |
| 5,632,465 A | * | 5/1997 | Cordua ......................... 251/46 |
| 5,732,929 A | | 3/1998 | Luppino et al. |
| 5,853,026 A | | 12/1998 | Wlodarczyk et al. |
| 5,909,747 A | | 6/1999 | Schieber |
| 6,796,329 B1 | | 9/2004 | Swenson, Jr. |
| 6,832,625 B2 | | 12/2004 | Ford |

FOREIGN PATENT DOCUMENTS

| | | |
|---|---|---|
| JP | 56028375 | 3/1981 |
| JP | 1299376 | 12/1989 |
| JP | 3089090 | 4/1991 |
| JP | 6117571 | 4/1994 |
| JP | 7208637 | 8/1995 |
| JP | 7229580 | 8/1995 |
| JP | 7332530 | 12/1995 |

* cited by examiner

*Primary Examiner*—John K Fristoe, Jr.
(74) *Attorney, Agent, or Firm*—Fitch, Even, Tabin & Flannery

(57) ABSTRACT

There is provided a valve assembly with an inlet passage and an outlet passage in communication with a valve chamber, a diaphragm mounted at the valve chamber for movement between a closed position, substantially preventing the flow of fluid from the inlet passage to the outlet passage, and an opened position, defining a path of fluid flow between the inlet passage and the outlet passage, and a pressure chamber disposed in the valve chamber above the diaphragm for retaining fluid pressure to control the diaphragm position. The valve assembly provides improved support for the diaphragm at an outlet aperture of the pressure chamber, air bleed from the pressure chamber, and upstream shutoff.

27 Claims, 8 Drawing Sheets

VALVE ASSEMBLY

FIELD OF THE INVENTION

The present invention relates generally to a valve assembly and, more specifically, to a bladder-style valve assembly that enhances longevity, serviceability and reliability of the valve assembly.

BACKGROUND OF THE INVENTION

Fluid control valve assemblies are used in a variety of fluid systems. For example, irrigation sprinkler systems commonly include a fluid control valve for controlling the supply of water under pressure to one or more irrigation sprinkler devices, which deliver the irrigation water to surrounding terrain and associated vegetation. Fluid control valves are intended to define a path permitting the flow of fluid along the flow line when the valve is opened, and to form a fluid-tight seal preventing the flow of fluid when the valve is closed.

Many conventional fluid control valves suffer from a significant pressure spike when the valve is closed and the fluid flow is abruptly stopped. The pressure spike is the resulting rapid rise in pressure above the static pressure of the source caused by water hammer. The shock wave caused by water hammer can be of sufficient magnitude to cause physical damage to piping, equipment, and, in severe cases, may present a safety hazard.

One valve design that significantly reduces the water hammer effect is the bladder-style valve. One version of the bladder-style valve is described in U.S. Pat. No. 5,632,465. Bladder-style valves include a hemispherical diaphragm that seals into a hemispherical portion of a valve chamber, thereby isolating the inlet from the outlet when the valve closes. The diaphragm gradually rolls over the inlet and the outlet as it closes so that the energy due to the motion of the fluid flow is essentially zero by the time the valve is closed. Consequently, water hammer is avoided. Bladder-style valve designs have an additional advantage over many conventional fluid control valves in that pressure loss is significantly lower, there are fewer parts in the design, which results in lower material cost, lower tooling cost, fewer assembly processes, and lower material logistics costs.

Current bladder-style valve designs have three drawbacks. The first drawback is that the diaphragm tends to be forced through the outlet aperture, especially at higher pressures. This abrades the diaphragm against the sharp aperture edges that result from molding the body of the valve. This forced abrasion results in significant scoring and cutting after only a relatively few cycles. The second drawback is that the entire system must be shut down to service the valve. The third is that air remains stuck in the bonnet even after the valve is run for some time. This air can result in undesirable valve-closing characteristics.

Thus, it would be desirable to provide a bladder-style valve that protects the diaphragm from abrasion and cutting, is easily serviced without shutting down the entire irrigation system, and is able to release all the air out of the bonnet to improve closing characteristics.

DETAILED DESCRIPTION OF THE PREFERRED EMBODIMENTS

Figure 1:
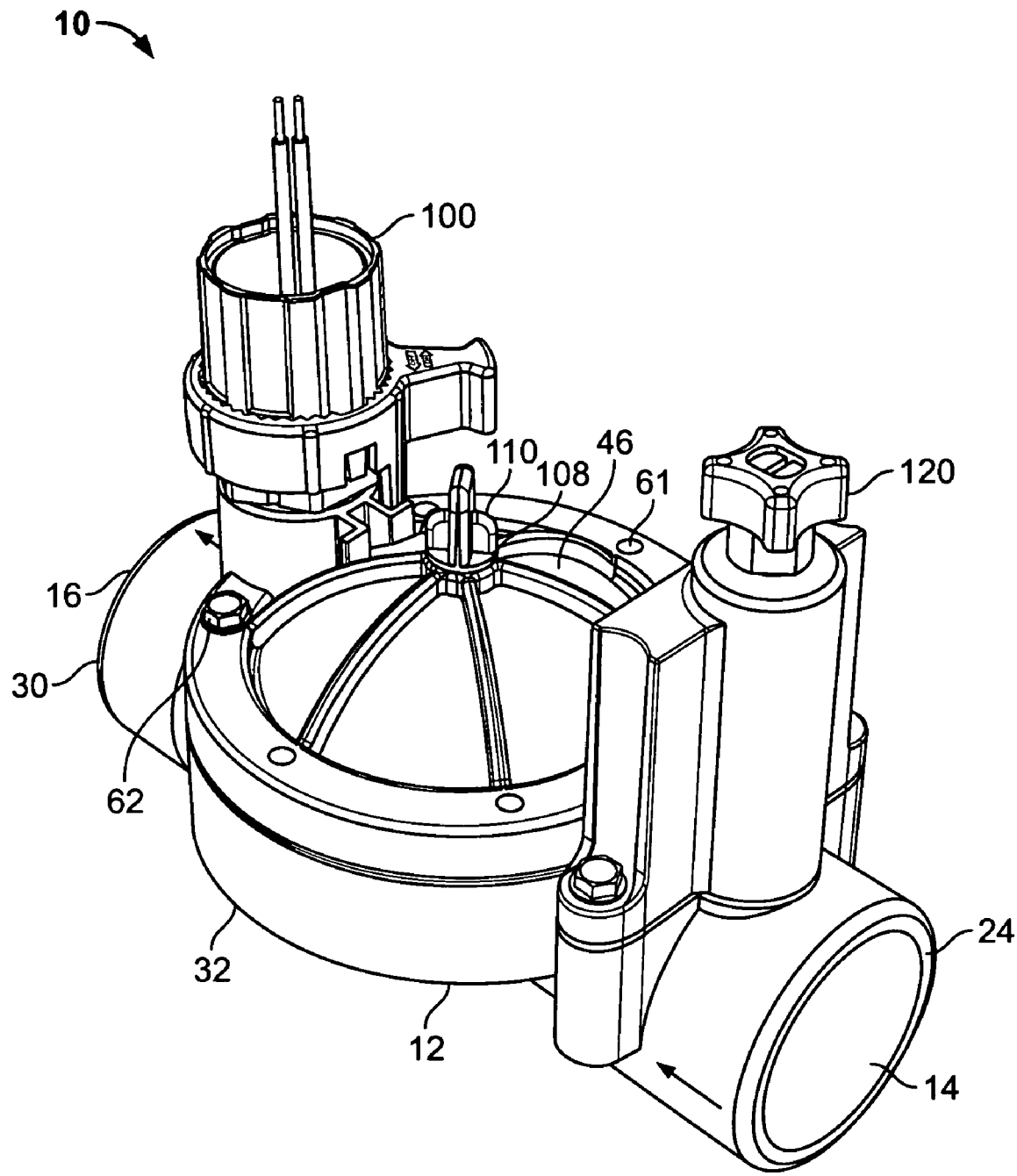
FIG. 1 is a perspective view of an example of valve assembly embodying features of the present invention.
Figure 2:
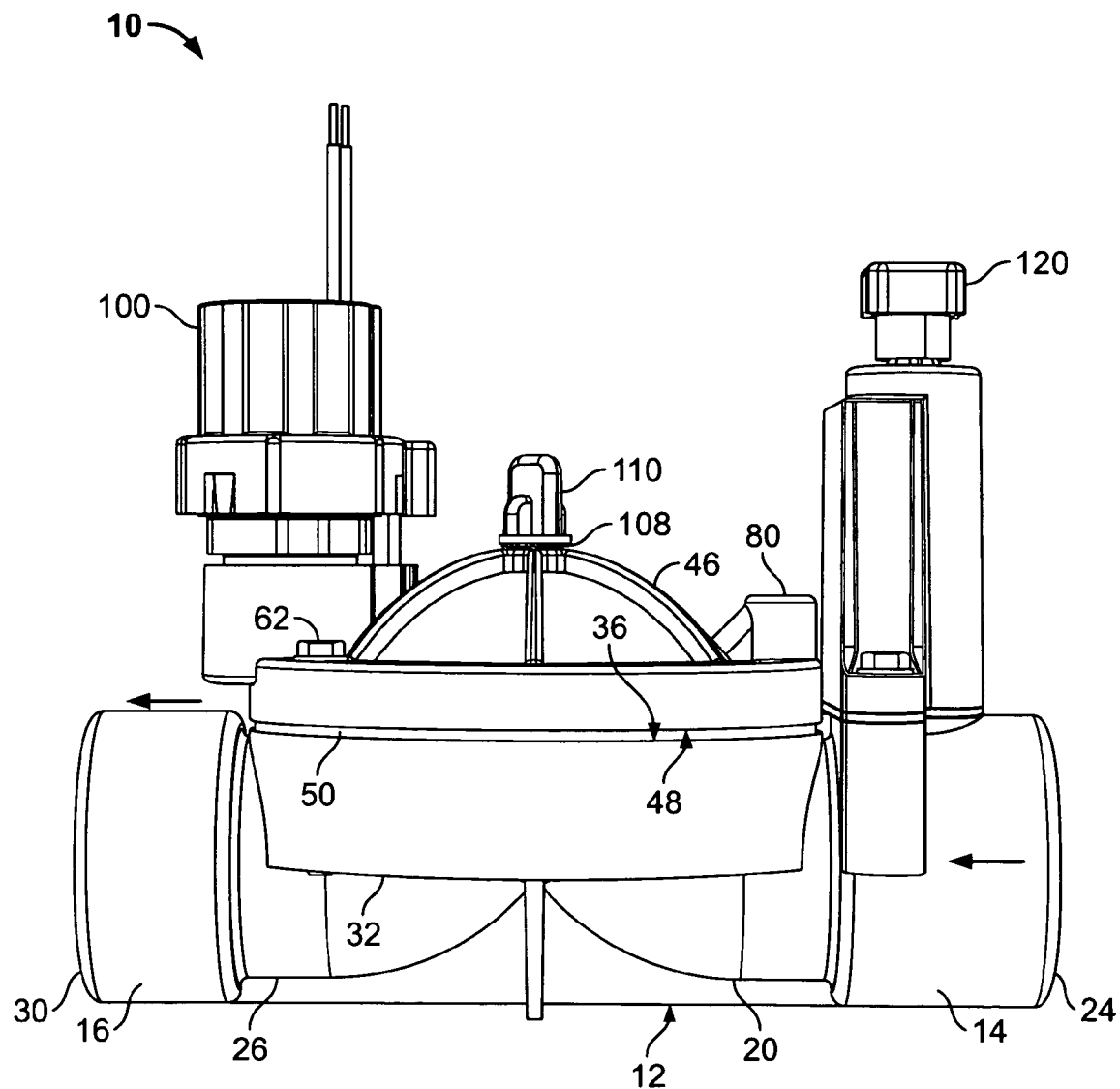
FIG. 2 is a front elevational view of the valve assembly of FIG. 1.
Figure 3:
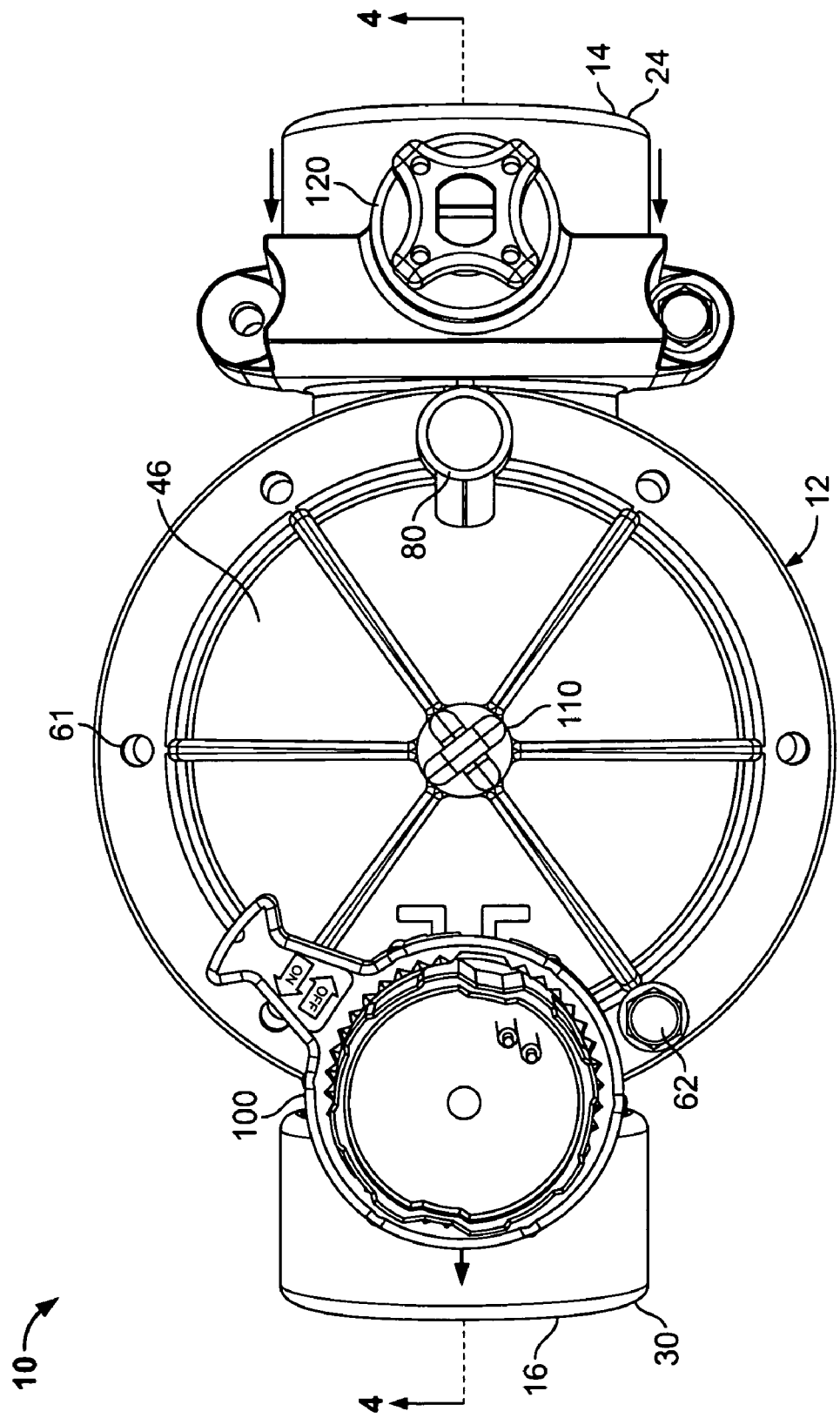
FIG. 3 is a top plan view of the valve assembly of FIG. 1.

With reference to the above FIGS. 1-8, there is illustrated a valve assembly 10 having a housing 12 defining an inlet passage 14, an outlet passage 16, and a valve chamber 18 in communication with both the inlet passage 14 and the outlet passage 16 and disposed therebetween. The inlet passage 14 is disposed upstream of the valve chamber 18 and includes a generally cylindrical conduit 20 with an inner end 22 opening into the valve chamber 18 and an outer end 24 for coupling to an upstream fluid supply conduit (not shown). Similarly, the outlet passage 16, disposed downstream of the valve chamber 18, includes a generally cylindrical conduit 26, with an inner end 28 opening into the valve chamber 18 and an outer end 30 for coupling to a downstream fluid supply conduit (not shown).

The housing 12 includes a lower base 32 having an internal, generally hemispherical surface 34 circumferentially bounded by a generally planar, first annular surface 36. The generally hemispherical surface 34 defines an inlet aperture 38 in fluid communication with the inner end 22 of the inlet passage 14 and an outlet aperture 40 in fluid communication with the inner end 28 of the outlet passage 16. The inlet and outlet apertures 38, 40 are separated by a center portion 42 of the generally hemispherical surface 34.

The housing 12 includes a generally hemispherical bonnet 46 coupled to the lower base 32 to define the valve chamber 18. The bonnet 46 is bounded by a generally annular planar surface 48 for alignment with and coupling to the first annular surface 36 of the lower base 32.

A resilient diaphragm 50 is mounted at the valve chamber 18 for movement between a closed position, substantially preventing the flow of fluid from the inlet passage 14 to the outlet passage 16, and an opened position, defining a path of fluid flow between the inlet passage 14 and the outlet passage 16. More specifically, the resilient diaphragm 50 includes a generally hemispherical center portion 52 bounded by an annular planar portion 54, an upper surface 56, and a lower surface 58. The diaphragm 50 is mounted at the valve chamber 18 such that the generally hemispherical portion 52 is seated in or nested with the generally hemispherical surface 34 of the lower base 32. The generally hemispherical center portion 52 has a shape complementary to the generally hemispherical surface 34 of the lower base 32 such that it can lay against the generally hemispherical surface 34 over the inlet aperture 38 and the outlet aperture 40. The annular planar portion 54 of the diaphragm 50 is stacked between the annular surface 48 of the bonnet 46 and the annular surface 36 of the lower base 32 such that the annular surface 48 engages the upper surface 56 of the diaphragm 50 and the annular surface 36 engages the lower surface 58 of the diaphragm 50.

Figure 5:
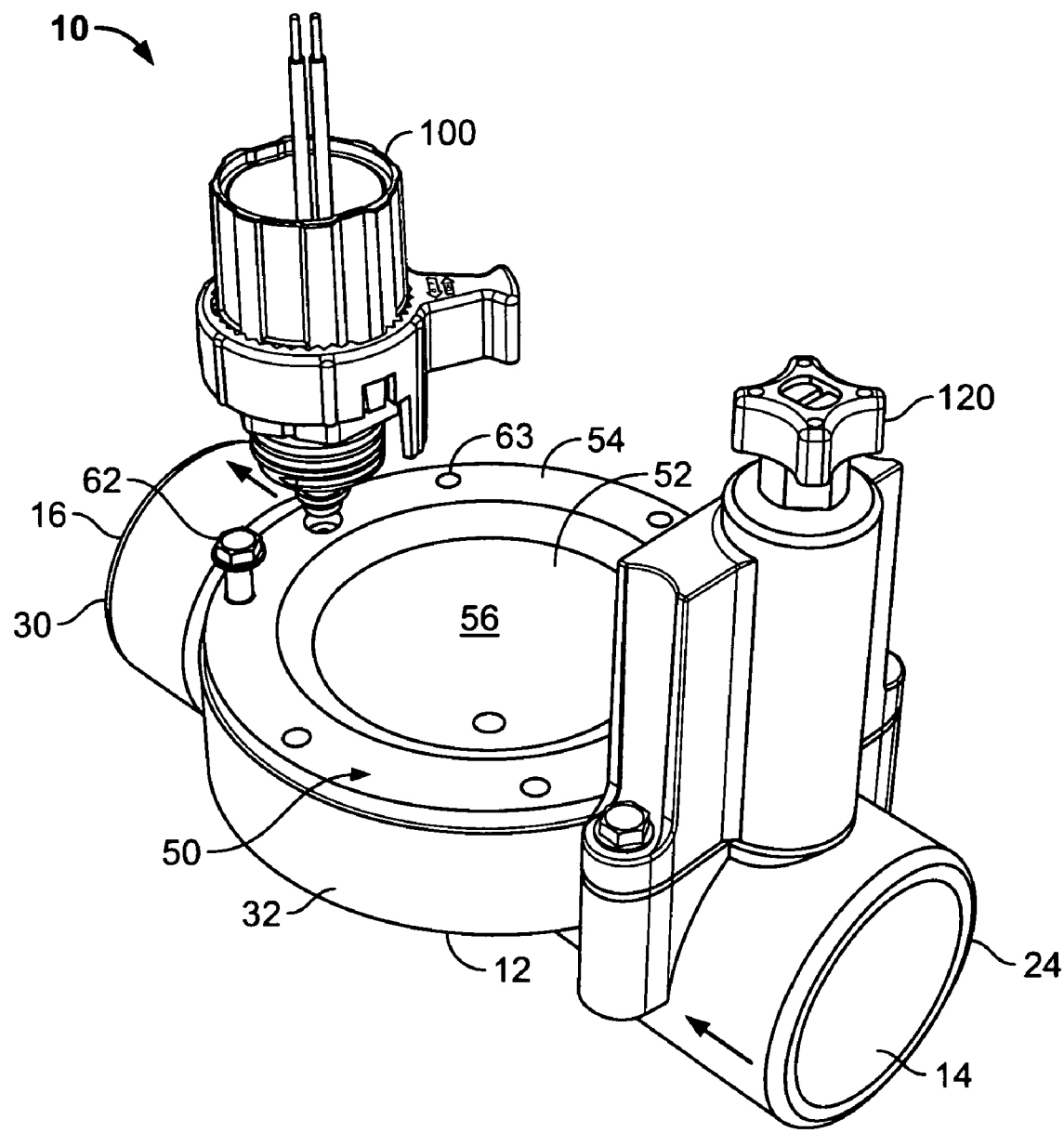
FIG. 5 is a perspective view of the valve assembly of FIG. 1 shown with the upper portion of the housing removed.
Figure 6:
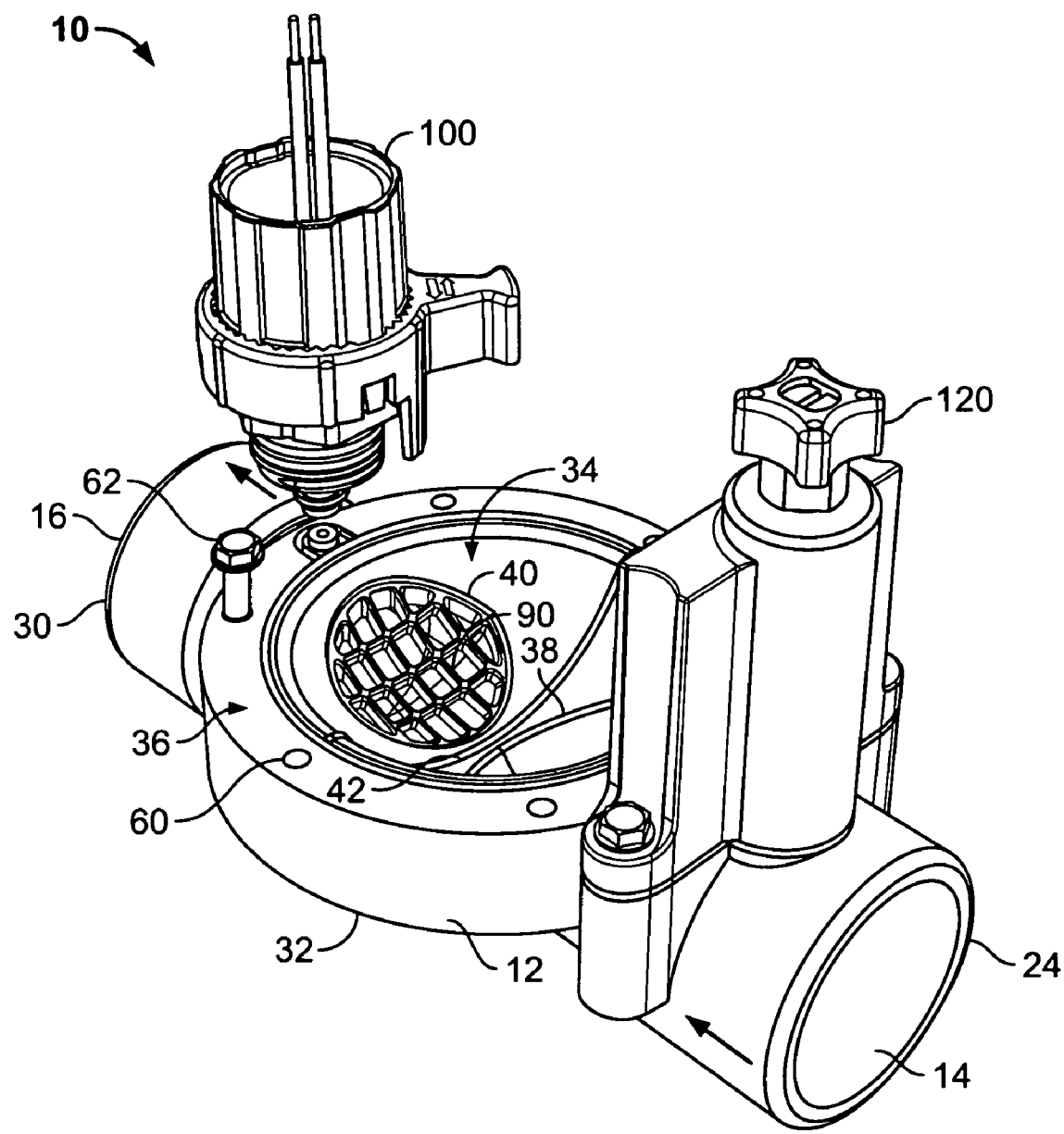
FIG. 6 is a perspective view of the valve assembly of FIG. 1 shown with the upper portion of the housing and the diaphragm removed.
Figure 7:
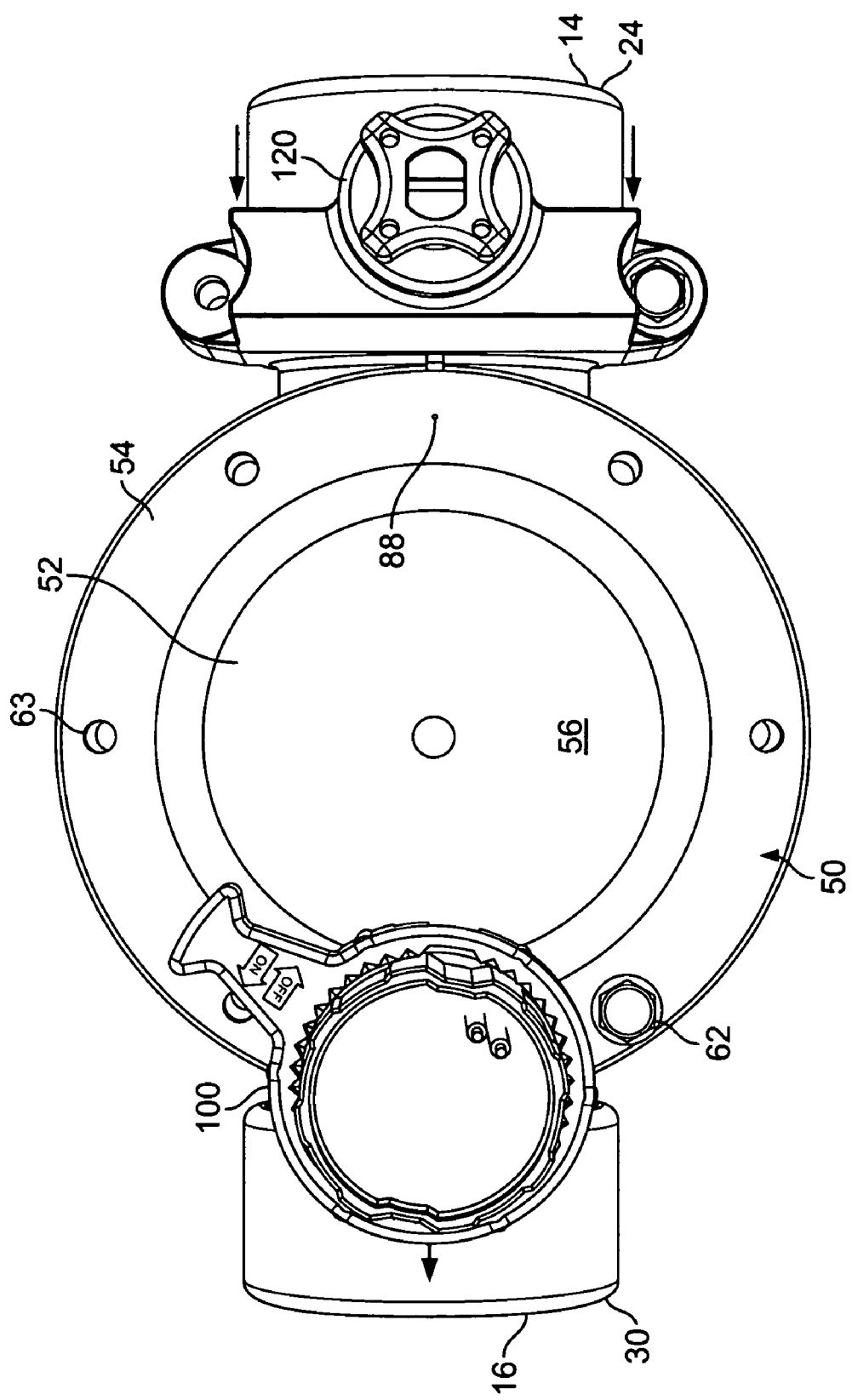
FIG. 7 is a top plan view of the valve assembly of FIG. 1 shown with the upper portion of the housing removed.
Figure 8:
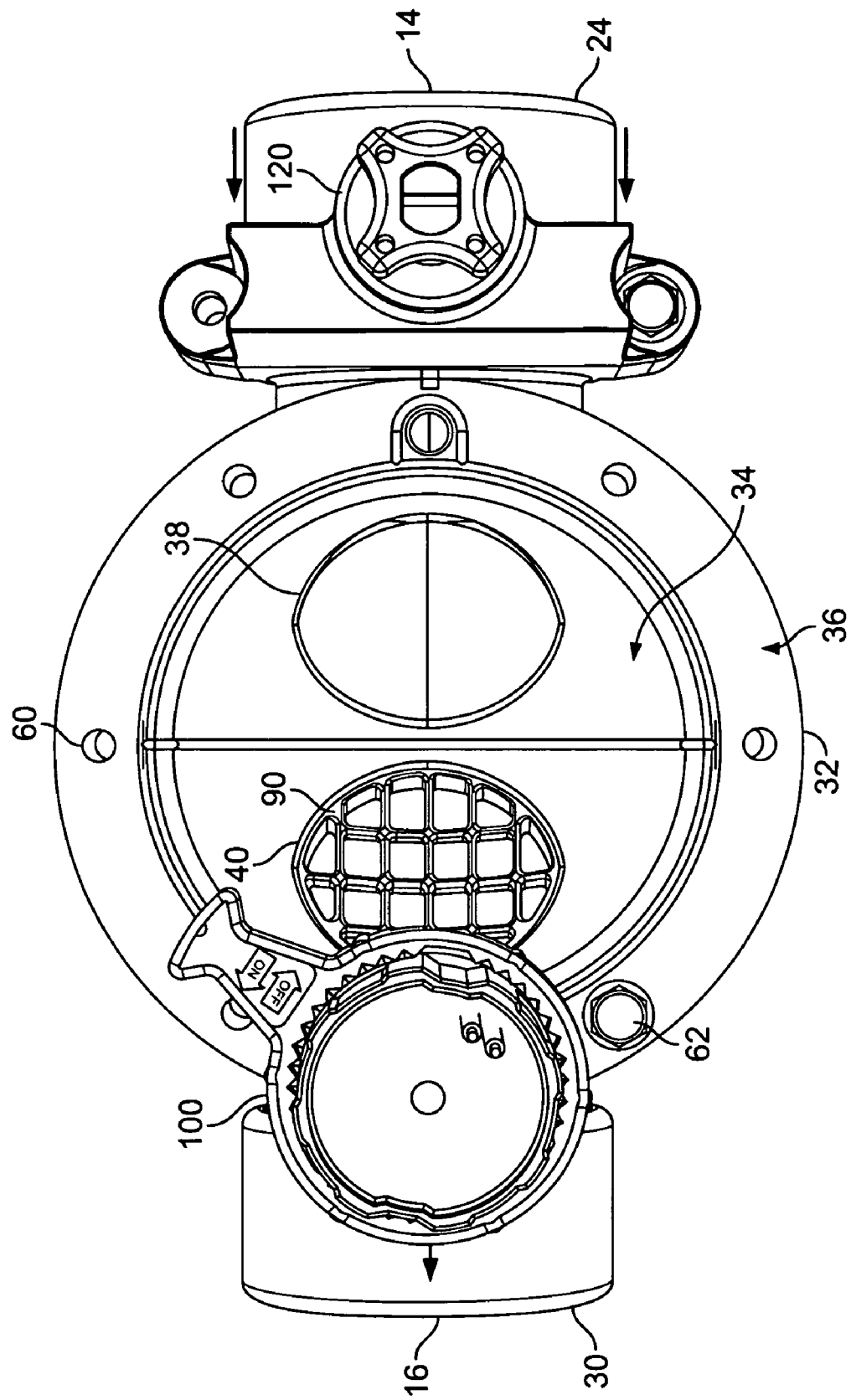
FIG. 8 is a top plan view of the valve assembly of FIG. 1 shown with the upper portion of the housing and the diaphragm removed.

As shown in FIGS. 1, 5, and 6, each of the annular surfaces 36, 48 and the annular planar portion 54 define a plurality of bores 60, 61 and 63, respectively, that align to receive a fastener 62, such as a hex washer screw, to assemble the bonnet 46 and the diaphragm 50 to the lower base 32. More specifically, when the diaphragm 50 is set on the lower base 32 of the housing 12, and the bonnet 46 is set on the diaphragm 50, the plurality of apertures 60,61 and 63 of each of the annular surfaces 36,48 and the annular planar portion 54 of the diaphragm 50 are aligned such that each set of aligned apertures can receive therethrough one of the fasteners 62. The bores 60 defined by the lower base 32 include internal threading for cooperation with the threading on the fasteners 62 to fixedly secure the bonnet 46 to the lower base 32 with the annular planar portion 54 of the diaphragm 50 sandwiched therebetween and the center portion 52 located within the valve chamber 18.

Figure 4:
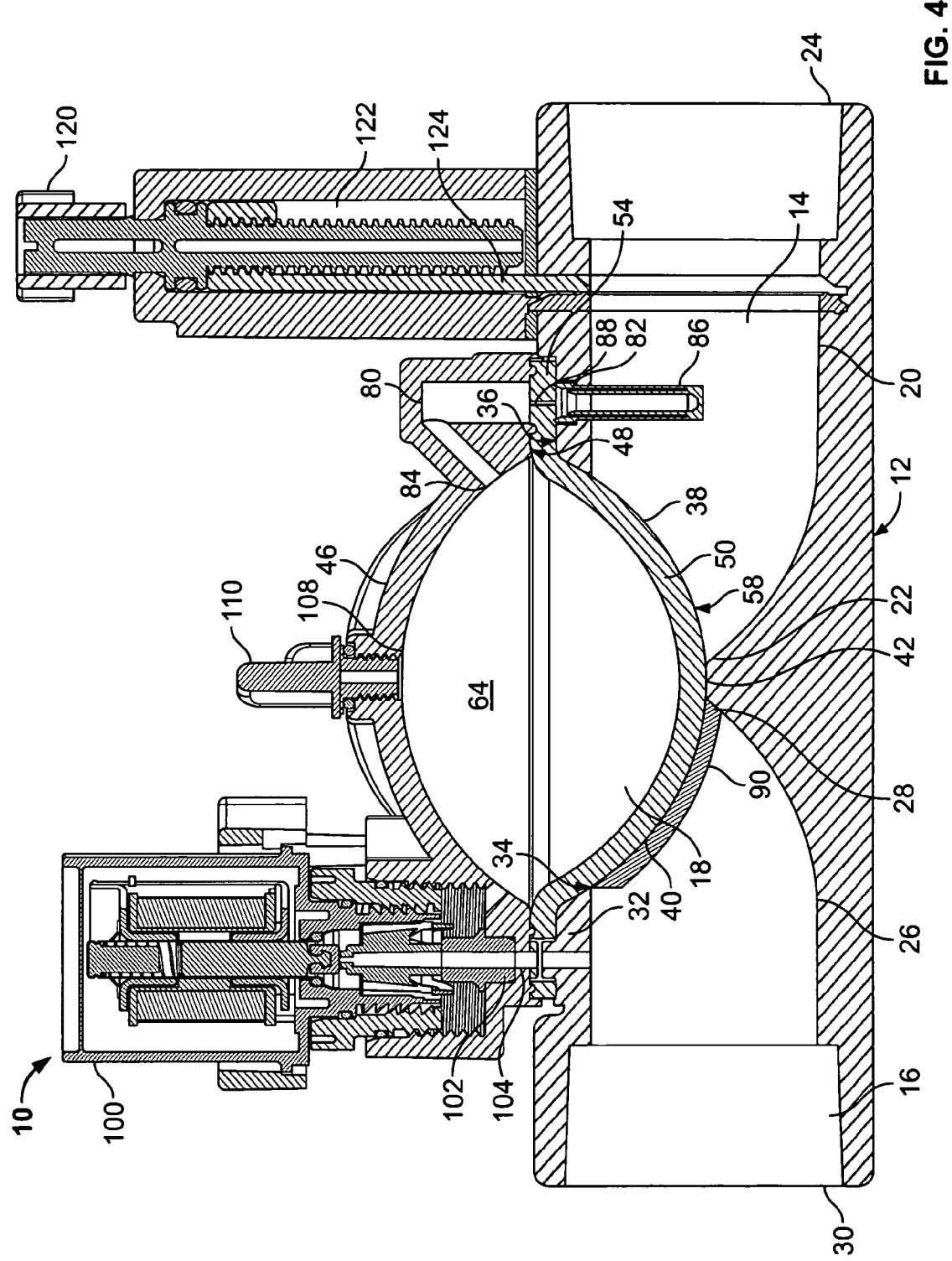
FIG. 4 is a cross-sectional view of the valve assembly of FIG. 1 taken along line 4-4 of FIG. 3.

As can be seen in FIGS. 4 and 5, the diaphragm 50 is in the closed position. More specifically, when the diaphragm 50 is fully seated on the hemispherical surface 34 of the lower base 32, it overlays completely the inlet aperture 38 and the outlet aperture 40, thereby preventing any flow of fluid from the inlet passage 14 to the outlet passage 16. The space between the upper surface 56 of the diaphragm 50 and the bonnet 46 defines a pressure chamber 64 above the diaphragm 50. Pressure in the pressure chamber 64 biases the diaphragm 50 toward the closed position and, above a predetermined threshold, will hold the diaphragm 50 in the completely closed position, despite the fluid pressure applied to the lower surface 58 of the diaphragm 50 from the inlet passage 14.

The opened position of the diaphragm 50 can have a varying degree of openedness ranging, for example, between being partially opened to fully opened. This can be controlled by the amount of fluid pressure in the pressure chamber 64 resisting the movement of the diaphragm 50 away from the inlet aperture 38 and the outlet aperture 40. This is done through the cooperation of the design parameters (such as volume flow) of an inlet control passage 80 and an outlet control passage 104. In the preferred embodiment, the design parameters are set so the diaphragm 50 moves between a completely open position and a completely closed position.

More specifically, as can be seen in FIG. 4, the inlet control passage 80 interconnects the inlet passage 14 and the pressure chamber 64. The inlet control passage 80 has a first end 82 in fluid communication with the inlet passage 14 upstream from the valve chamber 18 and a second end 84 in fluid communication with the pressure chamber 64 through the bonnet 46. Fluid from the inlet passage 14 flows through the inlet control passage 80 into the pressure chamber 64.

The inlet control passage 80 preferably includes a filter 86 in fluid communication with a reduced orifice 88 through diaphragm 50. As shown, for example, in FIG. 4, the filter 86 is disposed proximate the first end 82 of the inlet control passage 80. Thus, fluid in the inlet passage 14 flowing through the inlet control passage 80 to the pressure chamber 64 passes through the filter 86. The filtered fluid then flows through the orifice 88 and into the pressure chamber 64. As shown, for example, in FIG. 7, the orifice 88 is a small opening defined by the annular planar portion 54 of the diaphragm 50. The filter 86 removes materials such as algae, particles, and/or debris that could otherwise cause the relatively small orifice 88 to become clogged. This small orifice 88 provides resistance to flow through the inlet control passage 80 that is greater than the resistance through the outlet control passage 104 to allow the valve to be opened, as described below.

As shown, for example, in FIGS. 4 and 6, the valve assembly 10 further incorporates a support member 90 extending across the outlet aperture 40. The purpose of the support member 90 is to provide support for the diaphragm 50 when covering the outlet aperture 40 to resist the diaphragm 50 from being stretched down and forced through the outlet aperture. The preferred support member 90 includes a plurality of support ribs configured in a criss-cross pattern to form a mesh or screen across the outlet aperture 40. However, other suitable configurations, such as a varying number of support members extending across the outlet aperture 40 or different mesh patterns may be employed. The support member 90 may be formed of plastic or any suitable material that is not harmful to the diaphragm 50.

As mentioned above, the support member 90 resists the projection of the diaphragm 50 through the outlet aperture 40 into the outlet passage 16 being caused by the pressure in the pressure chamber 64 above the diaphragm 50. The support member 90 addresses leakage that may occur, for example, in prior designs where the diaphragm can be displaced from the hemispherical surface as it is forced through the outlet aperture. The support member 90 also extends the life of the diaphragm 50 because it minimizes the stretching, abrading, and cutting of the diaphragm 50 that can reduce the life of the diaphragm 50. A further advantage of the support member 90 is that the diaphragm 50 can be injection molded, thereby further reducing the cost.

The valve assembly 10 additionally includes a generally conventional solenoid valve 100 for selectively causing the diaphragm 50 to open and close the valve assembly 10. With reference to FIG. 4, the solenoid valve 100 is located downstream of the valve chamber 18. The solenoid valve 100 includes a plunger 102 that operates to open or close the outlet control passage 104 interconnecting the pressure chamber 64 and the outlet passage 16. When the solenoid valve 100 is closed, that is, with the plunger 102 blocking flow from the pressure chamber 64 to the outlet passage 16, the fluid admitted into the pressure chamber 64 via the inlet control passage 80 causes the pressure in the pressure chamber 64 to build, and consequently, the diaphragm 50 to gradually roll over the inlet aperture 38 and the outlet aperture 40 to close the valve assembly 10. Once the diaphragm 50 is in the closed position, the fluid pressure in the pressure chamber 64 maintains the diaphragm 50 in the closed position to prevent flow from the inlet passage 14 to the outlet passage 16. This is due to the larger surface area of the diaphragm 50 exposed to the fluid pressure in the pressure chamber 64 as compared to the inlet passage 14 side of the diaphragm 50.

When the solenoid valve 100 is actuated, the plunger 102 lifts to permit fluid in the pressure chamber 64 to flow through the outlet control passage 104 to the outlet passage 16. As a result of the relatively small size of the orifice 88 compared to the outlet control passage 104, the resistance to flow through the inlet control passage 80 is greater than the resistance through the outlet control passage 104. Consequently, when the outlet control passage 104 is open, fluid will more quickly flow out of the pressure chamber 64 through the outlet control passage 104, than into the pressure chamber 64 through the inlet control passage 80. As such, the pressure above the diaphragm 50 reduces, allowing the diaphragm 50 to be gradually lifted up off of the inlet and outlet apertures 38, 40 by the fluid flowing into the valve chamber 18 through the inlet aperture 38. Once the diaphragm 50 lifts from covering at least a portion of the inlet aperture 38 and the outlet aperture 40, flow occurs from the inlet passage 14 to the outlet passage 16.

The solenoid valve 100 may be operably connected to any suitable electrical control system known to those of skill in the art. The electrical control system may include, for example, a timer or a programmable control system, for operation of the solenoid valve 100 at a predetermined time.

The valve assembly 10 preferably includes a bleed port 108 to manually remove unwanted gas from the pressure chamber 64 and other areas of the valve assembly 10 above the diaphragm 50. The preferred bleed port 108 is positioned at the peak of the bonnet 46. This ensures that most, if not all, of the gas in the pressure chamber 64 will escape through the bleed port 108. In contrast, when the bleed port is not at the peak, gas above the bleed port in the pressure chamber tends not to escape from the pressure chamber. Gas in the pressure chamber 64 negatively affects the operation of the valve. For example, it can contribute to undesirable closing characteristics.

The preferred bleed port 108 includes internal threading that mates with complementary external threading on an external bleed screw 110. The external bleed screw 110 may be manually rotated relative to the bleed port 108 to release the gas from the pressure chamber 64 through the bleed port 108.

As best seen in FIG. 4, the preferred valve assembly 10 includes a shutoff valve 120 upstream of the valve chamber 18 in communication with the inlet passage 14. The shutoff valve 120 enables the fluid flow to be stopped upstream of the valve chamber 18. When the shutoff valve 120 is closed, the bonnet 46 can be removed, and the valve assembly can be repaired and/or serviced, for example, to replace the diaphragm, without having to shut down the entire system.

The preferred shutoff valve 120 includes a generally conventional gate valve 122, including a gate 124 that may be manually lowered to block the path of the fluid. Other suitable shutoff valves may include, for example, a ball valve or a butterfly valve. As illustrated, the preferred shutoff valve 120 has at least a portion of its body integrally molded with the housing 12 of the valve. This enables the valve assembly 10 to be a complete serviceable unit that is installed together.

The foregoing relates to preferred exemplary embodiments of the invention. It is understood that other embodiments and variants are possible which lie within the spirit and scope of the invention as set forth in the following claims.

What is claimed is:

1. A valve comprising:
an inlet passage;
an outlet passage;
a valve chamber interconnecting the inlet passage and the outlet passage, the valve chamber defining an inlet aperture in communication with the inlet passage and an outlet aperture in communication with the outlet passage and defined by an arcuate valve seat, and defining, at least in part, a straight path for fluid flow extending from the inlet passage to the outlet passage;
a diaphragm mounted at the valve chamber and operable between a first position sealing the inlet aperture and the outlet aperture to resist flow through the valve chamber from the inlet passage to the outlet passage and a second position spaced from at least a portion of the inlet aperture and the outlet aperture to allow flow through the valve chamber from the inlet passage to the outlet passage;
a pressure chamber disposed in the valve chamber above the diaphragm for retaining fluid pressure to control movement of the diaphragm; and
at least one arcuate support member corresponding to and extending across the outlet aperture and the straight path to support the diaphragm, wherein the at least one support member resists projection of the diaphragm through the outlet aperture toward the outlet passage.

2. The valve of claim 1 wherein the at least one arcuate support member comprises a plurality of arcuate support members extending across the outlet aperture to support the diaphragm.

3. The valve of claim 2 wherein the plurality of arcuate support members comprises a mesh extending across the outlet aperture to support the diaphragm.

4. The valve of claim 1 comprising:
an inlet control passage interconnecting the inlet passage and the pressure chamber; and
an outlet control passage interconnecting the pressure chamber and the outlet passage.

5. The valve of claim 1 wherein the valve chamber comprises a hemispherical surface about the inlet aperture and the outlet aperture and the diaphragm comprises a complementary hemispherical surface.

6. The valve of claim 1 comprising a shutoff valve being at least in part integral with the inlet passage.

7. The valve of claim 6 wherein the shutoff valve is a gate valve.

8. The valve of claim 1 wherein the valve chamber defines a bleed port at a location such that substantially all of any gas present in the pressure chamber can be released through the bleed port.

9. The valve of claim 8 wherein the bleed port includes internal threading to mate with complementary external threading on a bleed screw.

10. The valve of claim 1 wherein the at least one arcuate support member extends across the outlet aperture but not across the inlet aperture to strengthen the diaphragm against projecting downstream and causing excess stress on the diaphragm.

11. A valve for a liquid delivery system comprising:
an inlet passage;
an outlet passage;
a valve chamber interconnecting the inlet passage and the outlet passage, the valve chamber defining an inlet aperture in communication with the inlet passage and an outlet aperture in communication with the outlet passage;
a diaphragm mounted at the valve chamber and operable between a first position sealing the inlet aperture and the outlet aperture to resist flow through the valve chamber from the inlet passage to the outlet passage and a second position spaced from at least a portion of the inlet aperture and the outlet aperture to allow flow through the valve chamber from the inlet passage to the outlet passage;
a pressure chamber disposed in the valve chamber above the diaphragm for retaining fluid pressure to control movement of the diaphragm; and
a shutoff valve having a valve body and a drive mechanism being at least in part integrated with the inlet passage and disposed at the inlet passage to selectively block a liquid flow through the inlet passage to the pressure chamber independent of the fluid pressure in the pressure chamber, the inlet passage defining a slot, the drive mechanism being located outside the inlet passage for driving the valve body in a single plane through the slot into the inlet passage to block flow, and for retracting the valve body in a single plane through the slot to substantially outside of the inlet passage to permit flow.

12. The valve of claim 11 wherein the shutoff valve is a gate valve.

13. The valve of claim 11 comprising:
an inlet control passage interconnecting the inlet passage and the pressure chamber; and an outlet control passage interconnecting the pressure chamber and the outlet passage.

14. The valve of claim 13 wherein the valve chamber comprises a hemispherical surface about the inlet aperture and the outlet aperture and the diaphragm comprises a complementary hemispherical surface.

15. The valve of claim 11 comprising at least one support member extending across the outlet aperture to support the diaphragm, wherein the at least one support member resists projection of the diaphragm through the outlet aperture toward the outlet passage.

16. The valve of claim 15 wherein the at least one support member comprises a plurality of support members extending across the outlet aperture to support the diaphragm.

17. The valve of claim 16 where the plurality of support members comprises a mesh extending across the outlet aperture to support the diaphragm.

18. The valve of claim 11 wherein the valve chamber defines a bleed port at a location such that substantially all of any gas present in the pressure chamber can be released through the bleed port.

19. The valve of claim 18 wherein the bleed port includes internal threading to mate with complementary external threading on a bleed screw.

20. The valve of claim 11 further comprising: a housing defining at least the inlet passage, and the shutoff valve being mounted on the housing; a wall being attachable to the housing, at least partially defining the valve chamber and being detachable from the housing; and wherein the shutoff valve shuts off flow while the wall is detached from the housing.

21. A valve comprising:
an inlet passage;
an outlet passage;
a valve chamber interconnecting the inlet passage and the outlet passage, the valve chamber defining an inlet aperture in communication with the inlet passage and an outlet aperture in communication with the outlet passage and defined by an arcuate valve seat;
a diaphragm mounted at the valve chamber and operable between a first position sealing the inlet aperture and the outlet aperture to resist flow through the valve chamber from the inlet passage to the outlet passage and a second position spaced from at least a portion of the inlet aperture and the outlet aperture to allow flow through the valve chamber from the inlet passage to the outlet passage;
a pressure chamber disposed in the valve chamber above the diaphragm for retaining fluid pressure to control movement of the diaphragm;
at least one arcuate support member corresponding to and extending across the outlet aperture to support the diaphragm; and
the valve chamber defines a bleed port at least substantially at the peak of the pressure chamber such that substantially all of any gas present in the pressure chamber can be released through the bleed port.

22. The valve of claim 21 wherein the bleed port includes internal threading to mate with complementary external threading on a bleed screw.

23. The valve of claim 21 comprising a shutoff valve being at least in part integral with the inlet passage.

24. The valve of claim 23 wherein the shutoff valve is a gate valve.

25. The valve of claim 21 comprising:
an inlet control passage interconnecting the inlet passage and the pressure chamber; and
an outlet control passage interconnecting the pressure chamber and the outlet passage.

26. The valve of claim 25 wherein the valve chamber comprises a hemispherical surface about the inlet aperture and the outlet aperture and the diaphragm comprises a complementary hemispherical surface.

27. The valve of claim 21 comprising, wherein the at least one support member resists projection of the diaphragm through the outlet aperture toward the outlet passage.

* * * * *

UNITED STATES PATENT AND TRADEMARK OFFICE
CERTIFICATE OF CORRECTION

PATENT NO. : 7,552,906 B2
APPLICATION NO. : 11/487734
DATED : June 30, 2009
INVENTOR(S) : Kevin M. Irwin et al.

It is certified that error appears in the above-identified patent and that said Letters Patent is hereby corrected as shown below:

Column 8, Line 35, after "claim 21" delete "comprising,".

Signed and Sealed this

Fifteenth Day of September, 2009

David J. Kappos
*Director of the United States Patent and Trademark Office*